United States Patent [19]

Van Slageren

[11] 4,100,585

[45] Jul. 11, 1978

[54] MAGNETIC-TAPE GUIDE ARRANGEMENT

[75] Inventor: Nanno Van Slageren, Eindhoven, Netherlands

[73] Assignee: U.S. Philips Corporation, New York, N.Y.

[21] Appl. No.: 764,348

[22] Filed: Jan. 31, 1977

[30] Foreign Application Priority Data

Feb. 4, 1976 [NL] Netherlands .................. 7601106

[51] Int. Cl.² ............................................. G11B 15/60
[52] U.S. Cl. .................................................. 360/130
[58] Field of Search .................................. 360/130, 84

[56] References Cited

U.S. PATENT DOCUMENTS 2,921,990  1/1960  Ginsburg et al. ................. 360/84
3,972,074  7/1976  Vogel ................................ 360/130

Primary Examiner—Robert S. Tupper
Attorney, Agent, or Firm—Frank R. Trifari; David R. Treacy

[57] ABSTRACT

A magnetic-tape guide arrangement for a transverse scan tape recorder in which the magnetic tape is pressed in cupped form against two cylindrical drums at either side of a head disc which is rotatable about an axis parallel to the direction of transport of the magnetic tape, a pressure member having concave guide portions pressing the tape transversely toward the axis at locations to each side of the head disc between the disc and a respective drum. The supporting portions of the pressure member press against the drums and are located at an axial distance from each other which is at least as great as the distance which is covered by the magnetic tape during its movement from the one drum to the other drum.

2 Claims, 6 Drawing Figures

MAGNETIC-TAPE GUIDE ARRANGEMENT

BACKGROUND OF THE INVENTION

1. Field of the Invention

The invention relates to a magnetic-tape guide arrangement for a transversely reading and/or writing machine for magnetically recording and/or reproducing signals of large bandwidth, for example video signals, on a magnetic tape which is moved in its longitudinal direction, and hereinafter referred to as a transverse scan tape recorder; and more particularly to such a tape recorder having a multiplicity of magnetic heads which are mounted on a head disc rotatable about an axis of rotation which is parallel to the direction of movement of the magnetic tape, and comprises a pressure member which is transversely (radially) movable relative to said axis of rotation.

Such a recorder also includes two at least partly cylindrical drums which are coaxial with said axis of rotation and which are disposed on either side of the head disc, as well as resilient means for pressing the pressure member against the drums in the operating condition of the machine, the pressure member having concave guide portions and each of the two drums having convex guide portions for guiding the magnetic tape in a locally cupped condition along a part of the circular path of the magnetic heads. The axial distance between the convex guide portions in the direction of the axis of rotation of the head disc is greater than the axial distance between the concave guide portions, and the guide portions are so arranged relative to each other that in the operating condition a gap is formed between each concave guide portion and the nearest convex guide portion where the magnetic tape is entirely clear of the guide portions, while the pressure member and the drums contact each other at the location of the concave and convex supporting portions of substantially equal radius of curvature.

2. Description of the Prior Art

Such a magnetic-tape guide arrangement is described in the Applicant's co-pending Patent Application Ser. No. 636,925, filed Dec. 2, 1975, now U.S. Pat. No. 4,012,787. The magnetic-tape guide arrangement described therein forms part of a transversely scanning recorder of the type described above. The two drums between which the head disc is rotatably disposed are mounted on a mounting block which is provided with a V-shaped groove which cooperates with cylindrical portions of the two drums, so that an excellent alignment and positioning of the drums is obtained. The mounting block and the pressure member are radially movable relative to each other, so that it is possible to feed the tape between the pressure member and the drums in stretched form, before it is locally cupped by moving the drum and the pressure member towards each other. The two drums are disposed comparatively close to each other and the pressure member has such a width that it partly bridges the gap between the two drums. In the pressure member a cylindrical recess is formed whose radius corresponds to that of the two drums and the entire width of the pressure member functions as concave guide portion, except for a recessed part at the location of the center of the pressure member. This recessed part corresponds to the location where the video heads mounted on the head disc are in contact with the magnetic tape. During operation these heads will deform the magnetic tape over a slight depth. The two drums have recesses which extend axially beyond the width of the pressure member. Thus it is ensured that the magnetic tape between each convex and concave guide portion bridges a gap where the magnetic tape is entirely clear of any machine part.

The said recesses in the drums cover an arc along the cylindrical surface of the drums which is slightly greater than the arc which is covered by the cupped magnetic tape. With its cylindrical recess the pressure member covers an arc which is greater than the arc covered by the recesses in the cylindrical surface of the drums, in such a way that on both sides of the magnetic tape a portion of the pressure member extends which serves as a convex supporting portion. These two supporting portions on either side of the magnetic tape cooperate with corresponding portion of the two drums. These last-mentioned portions consequently serve as concave supporting portions.

Thus, in the known magnetic-tape guide arrangement the pressure member is supported at the top and bottom of the magnetic tape, while the magnetic tape is guided by the two drums at the left and right on both sides of the pressure member. This means that the axial distance between the cylindrical portions of the drums at the top and bottom of the tape should be smaller than the axial distance between the cylindrical portions of the drums which function as convex guide portions. In the known magnetic tape guide arrangement the distance at the said location is just great enough to leave the head disc with its heads free.

The known magnetic-tape guide arrangement has two drawbacks. First of all the stability of the pressure member support on the two drum sections is inadequate because of the limited width of the pressure member. A second drawback is a fact that the recesses must be formed in the two drums resulting in a transition from the cylindrical surface of the drum to the surface of the recess at the location where the pressure member bears on the drums. Forming such a recess demands additional operations, while at the transition of said two surfaces local deformations may be produced which tend to mis-align the pressure member.

SUMMARY OF THE INVENTION

The object of the invention is to provide a magnetic-tape guide arrangement which provides reliable alignment using readily fabricated parts.

According to the invention concave and convex supporting portions are disposed axially on both sides of the head disc at an axial distance from each other which is at least as great as the distance which during operation is covered by the magnetic tape in its direction of movement from the one drum to the other drum.

In the magnetic-tape guide arrangement in accordance with the invention the pressure member is no longer exclusively supported by the two drums underneath and above the magnetic tape, but also farther to each side of the concave magnetic tape guiding surfaces; i.e., at least so far sideways as the convex guide portions are located. As a result of this the stability of the pressure member support is substantially improved by the greater axial distance of the supporting portions, and manufacturing is simplified because there are no interruptions in the cylindrical surfaces of the drums. The two drums are simply arranged at an axial distance from each other which corresponds to the distance to be covered by the magnetic tape from the one convex guide portion to the other convex guide portion.

Of practical significance are those pressure members which are part of a unitary assembly, the concave guide portions being formed by two arcuate ridges which are disposed at some axial distance from each other, these tape-guiding surfaces being disposed along an imaginary cylinder, and the supporting portions which locate the pressure member being disposed near the ends of said ridges and comprising supporting surfaces on the same imaginary cylinder. A preferred embodiment of the invention is a pressure member whose supporting surfaces consist of axially extending local continuations of the cylindrical surfaces of the ridges. Such a pressure member may for example be formed from a suitable plastic by injection-molding, or cast from a suitable metal, after which in a single machining operation, such as a grinding operation or turning operation, both the concave guide portions and supporting portions may be formed.

BRIEF DESCRIPTION OF THE DRAWING

The invention will be described in more detail with reference to the drawing, in which.

DESCRIPTION OF THE PREFERRED EMBODIMENT

Figure 1:
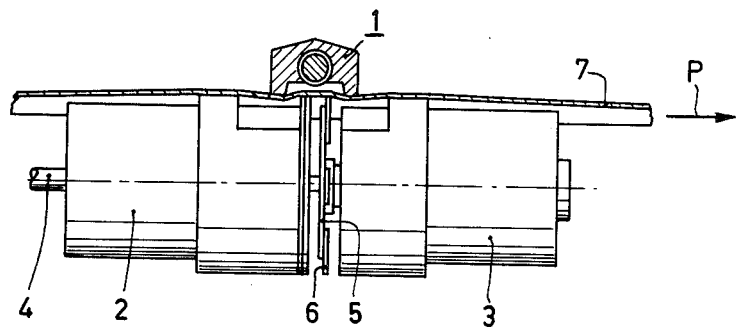
FIG. 1 is a plan view of a known magnetic-tape guide arrangement, the pressure member and tape being shown in cross-section.
Figure 2:
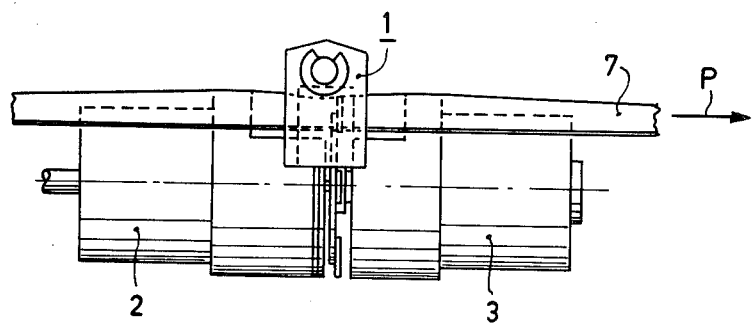
FIG. 2 is a plan view of the device of FIG. 1, the pressure member now also being shown in plan view.

The magnetic-tape guide arrangement of FIGS. 1 and 2 comprises a pressure member 1 and two drums 2 and 3. A rotating shaft 4 on which a head disc 5 is mounted is journalled in the drums. On the head disc four magnetic heads 6 are mounted, for example by glueing. A magnetic tape 7, in cupped form, is moved past the head disc, in a direction of movement which is indicated by an arrow P and which is parallel to the axis of rotation of said spindle 4.

The magnetic-tape guide arrangement of FIGS. 1 and 2 forms part of a transversely reading video recorder which has been described comprehensively in the Applicant's previous application Ser. No. 636,925, now U.S. Pat. 4,012,787. For further information relating to this known video recorder reference is made to said patent.

The pressure piece 1 is movable to a limited extent in a radial direction, i.e. in a direction transverse to the axis of rotation of the head disc 5, while the two drums 2 and 3 are also jointly movable in a radial direction relative to the magnetic tape 7. This facilitates insertion of the magnetic tape between the guide portions of the drums and pressure piece. In the position shown in FIGS. 1 and 2 the pressure piece 1 is pressed against the two drums 2 and 3 by resilient means, not shown. The position shown corresponds to the operating position of the recorder.

Figure 3:
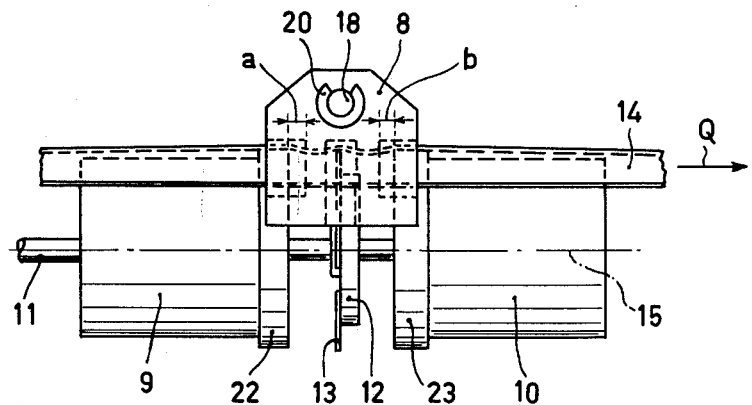
FIG. 3 is a plan view of a magnetic-tape guide arrangement in accordance with the invention.
Figure 4:
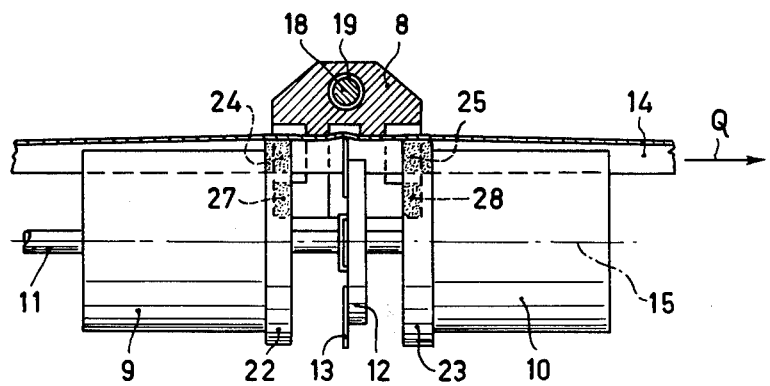
FIG. 4 is a plan view of the arrangement of FIG. 3, but with the pressure member and tape in cross-section.
Figure 5:
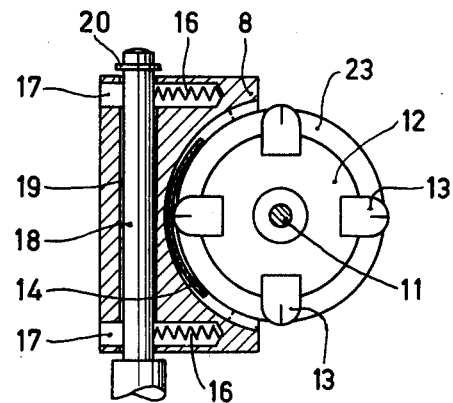
FIG. 5 is a cross-section of the magnetic-tape guide arrangement in accordance with FIGS. 3 and 4.

The magnetic-tape guide arrangement shown in FIGS. 3, 4 and 5 largely resembles that of FIGS. 1 and 2, except for the different shape of the pressure member and the deviating shape and placement of the two drums. The pressure piece is designated by the reference numeral 8, the two drums by 9 and 10, the shaft of the head disc by 11, the head disc itself by 12, the magnetic heads by 13, and the magnetic tape by 14. The direction of movement of this tape is indicated by the arrow Q. FIG. 5 shows that the pressure piece 8 is pressed against the drums 9 and 10 with the aid of two coil springs 16. These two springs are fitted in blind bores 17 in the pressure member and bear against a supporting pin 18 which, in a manner not shown, is connected to a slide of the transversely reading video recorder. The supporting pin 18 is fitted in a bore 19 in the pressure piece 8 with play and is provided with a retaining ring 20 at the top in order to limit the movements of the pressure piece 8 in the longitudinal direction of the supporting pin. As is evident from FIG. 5 the position of the pressure piece 8 is exclusively determined by the engagement of the pressure piece with the two cylindrical drums 9 and 10 and is not influenced by the pressure which is exerted thereon by the two springs.

Figure 6:
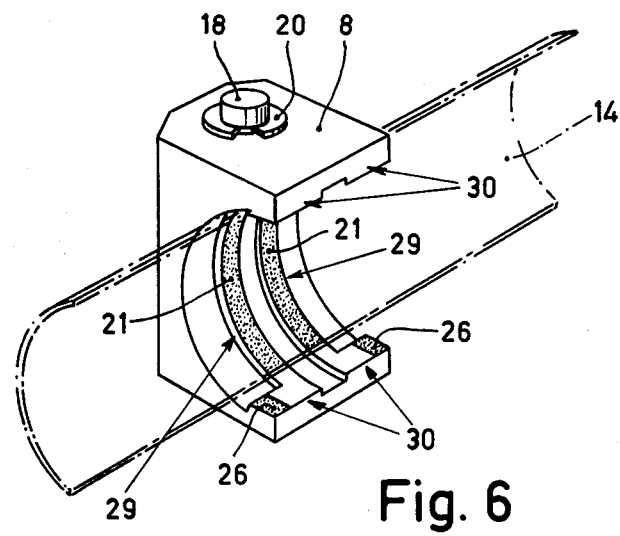
FIG. 6 is a perspective view of the pressure member of the magnetic-tape guide arrangement of FIGS. 3 through 5 on an enlarged scale, a part of a magnetic tape being represented by a dashed line.

The pressure piece, see in particular FIG. 6, comprises two concave guide portions 21, which are shaded in FIG. 6. The two cylindrical drums 9 and 10 are each provided with convex guide portions 24 and 25. FIG. 4 shows half of each of said convex guide portions. They form part of the cylindrical raised portions 22 and 23 of the drums 9 and 10 respectively and they are indicated and by a locally shaded area. Guide portions 24, 25 are disposed at an axial distance from each other in the direction of the axis of rotation 15, which distance is greater than the axial distance between the concave guide portions 21. Furthermore, the pressure piece 8 is so arranged relative to the two cylindrical raised portions 22 and 23 of the drums 9 and 10 that in the operating position, which is represented by FIGS. 3 through 5, a gap exists between each concave guide portion 21 and the nearest convex guide portion 24 or 25, in which gap the magnetic tape 14 is entirely clear of any guide portions. In FIG. 3 the axial length of the gap between the convex guide portion 24 and the nearest concave guide portion 21 is designated A, and the axial length of the gap between the convex guide portion 25 and the concave guide portion 21 is designated B. Generally the distances A and B will be selected equal.

In addition to concave guide portions the pressure piece 8, as shown particularly in FIG. 6, has concave supporting portions 26. In FIG. 6 two of these supporting portions are again indicated by a shaded area. In the operating condition these concave supporting portions contact the convex supporting portions, which in their turn form part of the cylindrical raised portions 22 and 23 of the two drums 9 and 10 respectively. In FIG. 4 two of such convex supporting portions 27, 28 are shown, again indicated by shaded areas. It will be evident from the drawing that four concave supporting portions and four convex supporting portions are provided.

The concave and convex guide portions and the concave and convex supporting portions all have the same radius of curvature. This means that in the operating condition in which the magnetic tape 14 is passed along the rotating magnetic heads 13 in cupped form in the direction of movement Q, the magnetic tape in convering the distance between the two cylindrical raised portions 22 and 23 cannnot retain an entirely cylindrical shape, but is subject to a deformation in the radial direction equal to the thickness of the magnetic tape between the convex and concave guide portions. It is obvious that as the magnetic tape 14 passes the magnetic head 13 it is also slightly deformed locally because the magnetic head should make contact with the magnetic tape 14 and must exert a certain contact pressure thereon for correct recording or sensing of the signal track. It would alternatively be possible to give the concave guide portions 21 a radius of curvature which is greater than that of the radius of curvature of the two cylindrical projections 22 and 23 by an amount equal to the thickness of the magnetic tape, so that the tape 14 can retain its cylindrical cupped shape at the transition from the one convex guide portion to the other. This embodiment is not shown in the drawing but will be obvious to those skilled in the art.

The concave and convex guide portions are disposed on both sides of the head disc 12 at an axial distance from each other which is as great as the axial distance between the two cylindrical raised portions 22 and 23 and consequently also as great as the distance which during operation is covered by the magnetic tape 14 in its direction of movement Q from one drum to the other drum.

FIG. 6 shows that the pressure member may consist of a unitary assembly. It comprises two arcuate ridges 29 which are disposed at an axial distance from each other and which at their ends adjoin ridges 30 which extend in opposite directions parallel to the direction of tape travel, transversely to the ridges 29. The shaded areas of FIG. 6 of the concave supports and guide portions are all disposed along a circular cylindrical surface whose radius equals that of the cylindrical raised portions 22 and 23 of the two drums 9 and 10. The pressure member 8 may be manufactured from a metal or a suitable plastic for example by injection-molding, after which the ridges 29 and 30 are finished by a suitable machining operation and acquire a perfectly cylindrical shape.

What is claimed is:

1. A magnetic tape guide arrangement for a transverse scan tape recorder, comprising a head disc rotatable about an axis parallel to a direction of movement of a magnetic tape; two at least partly cylindrical drums coaxial with said axis with one drum disposed each opposite side of the head disc; a pressure piece; means for mounting said pressure piece to be transversely movable relative to said axis of rotation; and resilient means pressing the pressure piece against said drums when said recorder is in an operating condition, each of the drums having a convex guide portion and the pressure piece having concave guide portions disposed to either side of the head disc contacting and guiding the magnetic tape in a locally cupped condition past said head disc, the axial distance between the convex guide portions being greater than the axial distance between the concave guide portions and the pressure piece being located so that an axially extending gap is formed between each concave guide portion and the respective nearer convex guide portion, said drums and said pressure piece having respective convex and concave supporting portions of substantially equal radius of curvature disposed adjacent to the edges of the magnetic tape, said pressure piece and drums contacting each other at said respective supporting portions in response to pressing by said resilient means, wherein said concave supporting portions and said respective convex supporting portions are disposed axially to each side of the head disc at an axial distance from each other at least as great as the distance between the convex guide portion of one drum and the convex guide portion of the other drum.

2. The magnetic tape guide arrangement as claimed in claim 1, wherein said pressure piece consists of a unitary mass of material, said concave guide portions being formed by two arcuate ridges disposed at a given axial distance from each other, tape guiding surfaces of said guide portions lying along a circular cylindrical surface; and said concave supporting portions comprise supporting surfaces on the same imaginary cylinder extending axially from said cylindrical surfaces of the ridges away from each other.

* * * * *